United States Patent
Onda

(10) Patent No.: US 10,544,258 B2
(45) Date of Patent: Jan. 28, 2020

(54) POLY(BUTYLENE TEREPHTHALATE) METHOD AND ASSOCIATED COMPOSITION AND ARTICLE

(71) Applicant: SABIC GLOBAL TECHNOLOGIES B.V., Bergen Op Zoom (NL)

(72) Inventor: Kayoko Onda, Tochigi (JP)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 61 days.

(21) Appl. No.: 15/755,783

(22) PCT Filed: Jul. 14, 2016

(86) PCT No.: PCT/EP2016/066735
§ 371 (c)(1),
(2) Date: Feb. 27, 2018

(87) PCT Pub. No.: WO2017/036653
PCT Pub. Date: Mar. 9, 2017

(65) Prior Publication Data
US 2019/0031827 A1 Jan. 31, 2019

Related U.S. Application Data

(60) Provisional application No. 62/211,056, filed on Aug. 28, 2015.

(51) Int. Cl.
| | | |
|---|---|---|
| *F21S 41/37* | (2018.01) | |
| *C08G 63/88* | (2006.01) | |
| *C08G 63/183* | (2006.01) | |
| *C08K 5/06* | (2006.01) | |
| *C08K 5/09* | (2006.01) | |
| *C08K 5/521* | (2006.01) | |
| *C08K 5/55* | (2006.01) | |

(52) U.S. Cl.
CPC ........... *C08G 63/88* (2013.01); *C08G 63/183* (2013.01); *C08K 5/06* (2013.01); *C08K 5/09* (2013.01); *C08K 5/521* (2013.01); *C08K 5/55* (2013.01); *F21S 41/37* (2018.01)

(58) Field of Classification Search
USPC ........................................................ 528/487
See application file for complete search history.

(56) References Cited

U.S. PATENT DOCUMENTS

| | | |
|---|---|---|
| 5,021,495 A | 6/1991 | Minnick |
| 7,256,228 B2 | 8/2007 | Agarwal et al. |
| 8,148,489 B2 | 4/2012 | Peacock et al. |
| 2006/0142422 A1 | 6/2006 | Kobayashi et al. |
| 2006/0235185 A1 | 10/2006 | Phelps et al. |
| 2006/0270824 A1 | 11/2006 | Leemans et al. |
| 2006/0287441 A1 | 12/2006 | Miyama et al. |
| 2008/0227920 A1 | 9/2008 | Weber et al. |
| 2009/0039557 A1 | 2/2009 | Klenz et al. |
| 2013/0137797 A1 | 5/2013 | Onda |
| 2013/0231440 A1 | 9/2013 | Alidedeoglu et al. |

FOREIGN PATENT DOCUMENTS

| | | | |
|---|---|---|---|
| EP | 1612234 | * | 1/2006 |
| WO | 2008052998 A1 | | 5/2008 |
| WO | 2016188890 A1 | | 12/2016 |

OTHER PUBLICATIONS

International Search Report and Written Opinion for International Application No. PCT/EP2016/066735, International Filing Date Jul. 14, 2016, dated Sep. 19, 2016, 11 pages.

* cited by examiner

*Primary Examiner* — Terressa Boykin
(74) *Attorney, Agent, or Firm* — Cantor Colburn LLP

(57) ABSTRACT

A method for reducing outgassing of a polyester composed of repeat units derived from 1,4-butanediol is melt blending the polyester with 0.2 to 2 weight percent water, based on the weight of the polyester. In addition to water, the polyester can also be blended with 0.01 to 0.5 weight percent of a quencher. The method results in formation of a polyester composition which exhibits reduced outgassing, and is suitable for molding into articles, for example an automotive headlight reflector or bezel.

17 Claims, 1 Drawing Sheet

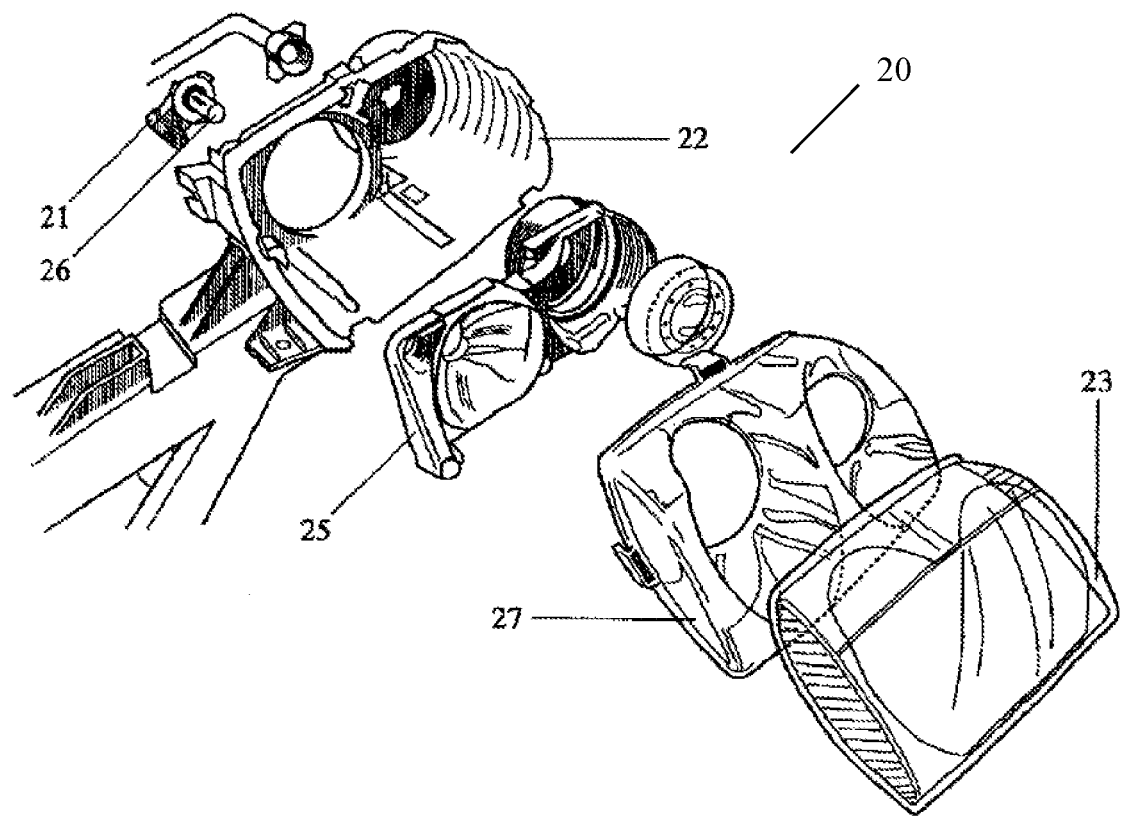

POLY(BUTYLENE TEREPHTHALATE) METHOD AND ASSOCIATED COMPOSITION AND ARTICLE

CROSS REFERENCE TO RELATED APPLICATIONS

This application is a National Stage application of PCT/EP2016/066735, filed Jul. 14, 2016, which claims the benefit of U.S. Provisional Application No. 62/211,056, filed Aug. 28, 2015, both of which are incorporated by reference in their entirety herein.

BACKGROUND OF THE INVENTION

Lightweight automotive headlight reflectors and bezels can be prepared by metallization, in which a thin light-reflecting metal layer is coated onto a thermoplastic substrate molded from a plastic such as polyester. A primer coat can be applied to the plastic substrate to provide a high surface gloss, and also to minimize distortion or "hazing" of the reflective metal layer when, in operation, the reflector or bezel encounters high temperatures and the outgassing of the thermoplastic substrate occurs. Outgassing is evaporation of volatile organic compounds from the plastic and concomitant condensation of the volatile organic compounds on nearby cooler surfaces, which causes the hazing.

Thermoplastic substrates exhibiting reduced outgassing at headlight operating temperatures are desirable. Ideally, the outgassing should be reduced enough for the primer coat to be omitted, so that the thin light-reflecting metal layer can be coated directly onto the plastic substrate. Outgassing of polyesters may be reduced to some extent by addition of a catalyst quencher, which reduces the activity of the catalyst in the melt. However the reduction in outgassing is limited, and may not be sufficient to provide articles having high surface gloss and free of visible surface defects, and to allow removal of the primer coat for metallized articles. There remains a need for an effective method to reduce outgassing of polyesters so that primer coat of metallized substrates can be omitted.

BRIEF SUMMARY OF EMBODIMENTS OF THE INVENTION

The present inventor has determined a method for reducing outgassing of a polyester comprising repeat units derived from 1,4-butanediol, comprising melt blending of a polyester mixture comprising the polyester and 0.2 to 2 weight percent water, based on the weight of the polyester.

The method results in formation of a polyester composition which exhibits reduced outgassing. Thus, a polyester composition is made by a method comprising melt blending of a polyester mixture comprising a polyester having repeat units derived from 1,4-butanediol and 0.2 to 2 weight percent water, based on the weight of the polyester.

An article comprises the polyester composition made by a method comprising melt blending of a polyester mixture comprising a polyester having repeat units derived from 1,4-butanediol and 0.2 to 2 weight percent water, based on the weight of the polyester.

These and other embodiments are described in detail below.

BRIEF DESCRIPTION OF THE DRAWING

The FIGURE shows an exploded view of an automotive headlamp assembly 20.

DETAILED DESCRIPTION OF THE INVENTION

Polyesters are used in molding compositions for making a variety of automotive parts, including headlamp reflectors and bezels. However, at the high operating temperatures of headlamps, polyesters comprising repeat units derived from 1,4-butanediol, for example poly(butylene terephthalate), are subject to outgassing of small amounts of tetrahydrofuran. The tetrahydrofuran is a by-product of copolymerization of 1,4-butanediol with dimethyl terephthalate, and is formed by cyclization of the 1,4-butanediol. The outgassing is evaporation of volatile organic compounds such as tetrahydrofuran from the polyester and concomitant condensation of the tetrahydrofuran on nearby cooler surfaces, which causes hazing of the metallized surfaces of the headlamp reflectors and bezels, adversely affecting their appearance and reflectivity.

The present inventor has determined a method for reducing outgassing of a polyester comprising repeat units derived from 1,4-butanediol, comprising melt blending of a polyester mixture comprising the polyester and 0.2 to 2 weight percent water, based on the weight of the polyester. A polyester composition exhibiting reduced outgassing is made by the method. Articles molded from the polyester composition exhibit reduced outgassing, high surface gloss, and are free of visible surface defects. Advantageously, a light-reflecting metal layer can be applied directly to the surface of these articles in a process termed "metallization" without using an intermediate primer layer between the surface of the article and the metal layer.

As used herein, "polyester mixture" refers to individual components in combination with the polyester before melt blending; and "polyester composition" refers to a blend of the individual components after melt blending. All of the variations in the polyester mixture described herein apply to the method, the polyester composition made by the method, and the article comprising the polyester composition. Moreover, the polyester mixture can include any combination of the technical features described herein.

The polyester can be a semi-crystalline polyester derived from 1,4-butanediol and at least one dicarboxylic acid, and have repeat units of structure (I):

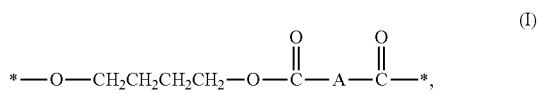

and A is a divalent group derived from an aromatic, aliphatic, or cycloaliphatic dicarboxylic acid. The polyester is formed by copolymerization (polycondensation) of 1,4-butanediol with an aromatic, aliphatic, or cycloaliphatic dicarboxylic acid or chemical equivalent having 6 to 20 carbon atoms. Functional equivalents of dicarboxylic acids are difunctional compounds that can also react with diols to form polyesters, for example the corresponding diesters, diacid halides, or when the acid groups are vicinal or ortho to each other, carboxylic acid anhydrides.

The diacid can be a $C_{6-20}$ aromatic diacid, $C_{2-20}$ straight chain or branched aliphatic diacid, or $C_{6-12}$ cycloaliphatic diacid. Examples of aromatic diacids include terephthalic acid, isophthalic acid, 1,2-di(p-carboxyphenyl)ethane, 4,4'-dicarboxydiphenyl ether, 4,4'-bisbenzoic acid, 1,4-naphthalene dicarboxylic, and 1,5-naphthalene dicarboxylic acid. Examples of aliphatic diacids include adipic acid, azelaic acid, 1,12-dodecanoic acid, and succinic acid. Examples of cycloaliphatic diacids include decahydronaphthalene dicarboxylic acids, norbornene dicarboxylic acids, bicyclooctane dicarboxylic acids, and 1,4-cyclohexane dicarboxylic acids. For example, the dicarboxylic acid can be terephthalic acid, isophthalic acid, or a combination thereof. The polyester having repeat units of structure (I) can be poly(butylene terephthalate). Examples of commercially available poly(butylene terephthalate)s include VALOX™ 195 and VALOX™ 315, available from SABIC Innovative Plastics, and PCT-1100-211X and PCT-1200-211D, available from Chang Chun Plastics Co., Ltd.

In addition to the repeat units of structure (I), the polyester can also comprise repeat units of structure (II):

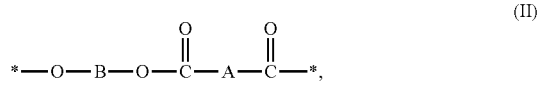

(II)

wherein A is as defined as above, and B is a divalent group derived from an aliphatic, cycloaliphatic, or aromatic diol. The diol can be a $C_{2-20}$ straight chain or branched aliphatic diol, a $C_{6-12}$ cycloaliphatic diol, or a $C_{6-20}$ aromatic diol. Examples of these diols include ethylene glycol, 1,2-propylene glycol, 1,3-propylene glycol, 2,2-dimethyl-1,3-propanediol, 2-ethyl-2-methyl-1,3-propanediol, 1,3- and 1,5-pentanediol, dipropylene glycol, 2-methyl-1,5-pentanediol, 1,6-hexanediol; dimethanol decalin, dimethanol bicyclooctane, cis-1,4-cyclohexane dimethanol, trans-1,4-cyclohexane dimethanol, triethylene glycol, 1,10-decanediol, and a combination thereof.

The polyester can also comprise repeat units of structure (III):

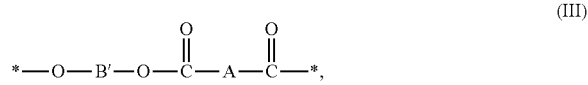

(III)

wherein A is as defined above, and B' is a divalent group derived from a poly($C_{2-6}$ alkylene oxide) diol having a number-average molecular weight of 100 to 5,000 daltons. Thus the polyester can be an elastomeric copolyetherester having short-chain repeat units of structure (I) and long-chain repeat units of structure (III), wherein A is derived from terephthalic acid, isophthalic acid, or a combination thereof. In particular, A can be derived from terephthalic acid, and B' can be derived from poly(butylene oxide) diol. The copolyetherester can comprise, based on the weight of the copolyetherester, 25 to 65 weight percent, more specifically 30 to 60 weight percent, and even more specifically 25 to 55 weight percent of divalent groups derived from polybutylene oxide diol. The copolyetherester can further comprise greater than 0 and less than or equal to 40 mole percent of repeat units derived from isophthalic acid. Copolyetheresters are commercially available under the HYTREL™ (Dupont), ARNITEL™ (DSM) and RITEFLEX™ (Ticona) trade names. Specific examples of copolyetheresters available from DuPont include HYTREL™ 4056 and HYTREL™ 5556.

The polyesters can be made by copolymerising the diol and the diacid or functional equivalent, for example 1,4-butanediol and a terephthalic diester and/or isophthalic diester in the melt in the presence of a catalyst. The catalyst can be an organometallic catalyst comprising titanium, antimony, or germanium. The catalyst can be, for example, titanium tetra(tert-butoxide), titanium tetra(tert-isopropoxide), antimony trioxide, antimony triacetate, or antimony glycolate/glycoxide. After polymerization is complete, the molten polyester is pumped from the polymerization vessel and allowed to solidify. The catalyst metal can be present at 10 to 1,000 parts per million based on the weight of the polyester. The catalyst is not removed from the polyester, and it can remain in an active form. While not wanting to be limited by theory, it is believed that when the polyester is reheated during remelting, extrusion, and molding, the catalyst can catalyze depolymerization and formation of tetrahydrofuran from residual 1,4-butanediol, or 1,4-butanediol released by depolymerization.

Poly(butylene terephthalate) and copolyetheresters comprising a poly(butylene terephthalate) block and a polyalkylene oxide block are two examples of commercially important polyesters that are susceptible to outgassing of tetrahydrofuran. In some embodiments of the method, the polyester composition made by the method, and the article comprising the polyester composition, the polyester is selected from a poly(butylene terephthalate), a copolyetherester comprising a poly(butylene terephthalate) block and a polyalkylene oxide block, and a combination thereof.

In some embodiments of the method, the polyester composition made by the method, and the article comprising the polyester composition, the polyester comprises a poly(butylene terephthalate) having an intrinsic viscosity of 0.6 to 1.5 deciliter per gram measured at 30° C. in 60:40 weight/weight phenol/tetrachloroethane in accordance with ASTM D-2857. Within this range, the intrinsic viscosity can be greater than or equal to 0.7 deciliters per gram and less than or equal to 1.4 or 1.3 deciliters per gram.

Polyesters are subject to hydrolysis under basic or acidic conditions, especially basic conditions. Polyester molding compositions (pellets) are often dried before injection molding. Therefore it is counter-intuitive to intentionally add water to a polyester prior to melt blending or molding, especially in view of the high temperatures required for melt blending and molding polyesters. The inventors have surprisingly determined that the addition of water can reduce outgassing, in particular outgassing of tetrahydrofuran. Without being limited by theory, it is believed that the water vaporizes during melt blending, and tetrahydrofuran and other volatile organic compounds are removed by steam distillation. The inventors have also determined that amounts of water effective in reducing outgassing do not result in hydrolytic degradation of the polyester under the melt blending or molding conditions used. The inventors have also determined that articles molded from the polyester composition made by this method exhibit high surface gloss, and are free of visible surface defects. A light-reflecting metal layer can be applied directly to the surface of these articles without using an intermediate primer layer between the surface of the article and the metal layer.

In particular, the method for reducing outgassing of a polyester comprises melt blending of a polyester mixture comprising the polyester and 0.2 to 2 weight percent water, based on the weight of the polyester. Within this range, the amount of water can be greater than or equal to 0.2, 0.25, or 0.5 weight percent and less than or equal to 2, 1.5, or 1 weight percent. Below 0.2 weight percent water, there may not be sufficient water to have any effect on headspace carbon. Above 2 weight percent water, too much steam can be generated for safe operation of extruder, and for the formation of continuous strands from the extruder die.

A quencher can have a further beneficial effect on outgassing of the polyester mixtures. Quenchers are chemical agents that inhibit activity of residual polymerization catalyst, and can thus reduce outgassing. The catalyst, which is effective for condensation polymerization, can also promote the reverse reaction (depolymerization) in the presence of residual water or alcohol, or promote other polyester degradation reactions. Thus in some embodiments of the method, the polyester composition made by the method, and the article comprising the polyester composition, the polyester mixture further comprises 0.01 to 0.5 weight percent, based on the weight of the polyester, of a quencher. The suitability of a particular compound for use as a quencher can be determined by determining the effect off the quencher on melt viscosity stability, volatile organic compound generation, for example tetrahydrofuran, and/or color stability.

The polyester mixture can comprise a quencher selected from the group consisting of phosphorous compounds, boric acid, aliphatic or aromatic carboxylic acids, carboxylic acid anhydrides, polyols, epoxies, or a combination thereof. In some embodiments, the quencher is a phosphorus compound selected from the group consisting of phosphites, diphosphites, phosphates, phosphonates, metaphosphoric acid, arylphosphinic acids, arylphosphonic acids, and a combination thereof. The phosphorous compound can have a dual function, for example it can serve as a quencher and a flame retardant.

The phosphorous compound can be an alkyl, aryl or mixed alkyl/aryl phosphite having at least one acidic hydrogen; an acid phosphate salt; a Group IB or Group IIB metal phosphate salt; a phosphorous oxo acid; an acid pyrophosphate salt; an organophosphorous compound; or a combination thereof. The phosphite can be of the structure (IV):

where $R^{13}$, $R^{14}$ and $R^{15}$ are independently selected from the group consisting of hydrogen, alkyl, and aryl, wherein at least one of $R^{13}$, $R^{14}$, and $R^{15}$ is hydrogen. Acid phosphate salts include sodium dihydrogen phosphate, mono zinc phosphate, potassium hydrogen phosphate, and calcium dihydrogen phosphate. Group IB or Group IIB metal phosphate salts include zinc phosphate. Phosphorous oxo acids include phosphorous acid, phosphoric acid, polyphosphoric acid, and hypophosphorous acid.

The phosphorous compound can be an acid pyrophosphate salt of formula V:

wherein M is a metal, x is a number from 1 to 12 and y is a number from 1 to 12, n is a number from 2 to 10, z is a number from 1 to 5 and the sum of (zx)+y is equal to n+2. M can be an alkaline or alkaline earth metal.

In some embodiments of the method, the polyester composition made by the method, and the article comprising the polyester composition, the quencher is a phosphorous compound of structure VI:

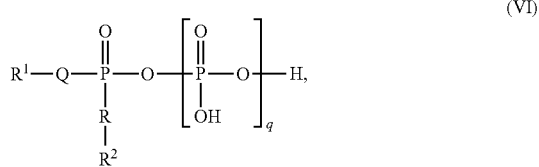

or salt thereof; wherein Q and R are each independently a direct bond or O; wherein $R^1$ and $R^2$ are independently selected from H, —OH, and substituted or unsubstituted $C_{1-20}$ alkyl, $C_{6-20}$ aryl, and poly(oxy $C_{2-4}$ alkylene); wherein a substituent, when present, is independently 1 or 2 in number on any of $R^1$ and $R^2$, and are independently selected from —OH, halogen, —COOH, —COOR$^3$ (wherein $R^3$ is $C_{1-4}$ alkyl) and —NH$_2$; wherein $R^1$ and $R^2$ are optionally linked together by a $C_{2-20}$ hydrocarbylene bridge; and wherein q is 0 or 1. In salts of the phosphorous compound of structure VIII, at least one active hydrogen, that is a hydrogen bonded to oxygen or phosphorous, is substituted by a cation. The cation can be for example, a metal ion, a quaternary ammonium cation, or a phosphonium cation. The metal ion can be from Groups IA, IIA, IIIA, IB, or IIBA of the periodic table. The mole ratio of cation to anion resulting from removal of a proton from oxygen or phosphorous (conjugate base of phosphorous compound of structure VIII) must be such that the salt has no net charge. Examples of phosphorous compounds of structure VIII include phosphorous acid ($H_3PO_3$), phosphoric acid ($H_3PO_4$), disodium dihydrogen pyrophosphate ($Na_2H_2P_2O_7$), calcium hypophosphite ($Ca(H_2PO_2)_2$), sodium hypophosphite ($NaH_2PO_2$), a mixture of monostearic and distearic acid phosphate, aluminium tris-diethylphosphinate, sodium 2,2'-methylenebis-(4,6-di-tert-butylphenyl) phosphate, and a combination thereof.

In some embodiments of the method, the polyester composition made by the method, and the article comprising the polyester composition, the polyester mixture further comprises 0.01 to 0.5 weight percent, based on the weight of the polyester, of the quencher. Within this range, the amount of quencher can be greater than or equal to 0.05 or 0.075 weight percent and less than or equal to 0.4, 0.3, or 0.2 weight percent. Above about 0.5 weight percent of quencher, the quencher can have an adverse effect on hydrolytic stability of the polyester. The threshold level of quencher resulting in reduced hydrolytic stability depends in part on the type of quencher. Below about 0.01 weight percent quencher, there can be insufficient quencher to further reduce outgassing. As can be seen from the present examples, the inventors have surprisingly determined that the combination of water and quencher can be synergistic, i.e. the reduction in outgassing obtained with a combination of water and quencher can be greater than the reduction in outgassing obtained with either water alone or quencher alone in the same amount of the combination of water and quencher.

As discussed above, quenchers are not necessary to obtain reductions in outgassing when water is used, and are therefore optional components. Thus in some embodiments of the method, the polyester composition made by the method, and the article comprising the polyester composition, the polyester mixture excludes quenchers. As used herein, the term, "excludes" means that the excluded component is not added to, and is therefore absent from, the composition. Quantitatively, a polyester mixture that excludes quenchers can have 0 to less than 0.01, 0.001, or 0.0001 weight percent (0 to less than 100, 10, or 1 parts per million by weight) quencher, based on the total weight of the polyester. The polyester mixture can comprise water and a phosphorous compound of formula VI, but not any other quencher. Thus in some embodiments of the method, the polyester composition made by the method, and the article comprising the polyester composition, the polyester mixture excludes quenchers other than the phosphorous compound.

The polyester mixture can include other components which do not interfere with the reduction in outgassing of the polyester obtained with water and/or the quencher, but provide other beneficial properties. For example, the polyester mixture can comprise an additive selected from flame retardants, fillers, colorants, stabilizers, mold release agents, lubricants, nucleating agents, and a combination thereof. Colorants include pigments and dyes. Stabilizers include antioxidants, such as hindered phenols, phosphites, and dithiopropionates, UV absorbers, such as benzotriazoles, and hindered amine light stabilizers. In some embodiments of the method, the polyester composition made by the method, and the article comprising the polyester composition, the polyester mixture further comprises 0.1 to 10 weight percent, based on the weight of the polyester, of an additive selected from the group consisting of flame retardants, fillers, colorants, stabilizers, mold release agents, lubricants, nucleating agents, and a combination thereof.

In some embodiments of the method, the polyester composition made by the method, and the article comprising the polyester composition, the polyester mixture comprises poly(butylene terephthalate) having an intrinsic viscosity of 0.6 to 1.5 deciliters per gram measured at 30° C. in 60:40 weight/weight phenol/tetrachloroethane; and 0.25 to 1.5 weight percent water. In some embodiments of the method, the polyester composition made by the method, and the article comprising the polyester composition, in addition to a poly(butylene terephthalate) having an intrinsic viscosity of 0.6 to 1.5 deciliter per gram measured at 30° C. in 60:40 weight/weight phenol/tetrachloroethane, and 0.25 to 1.5 weight percent water, the polyester mixture further comprises 0.05 to 0.2 weight percent, based on the weight of the polyester, of the quencher.

Polyester compositions made by the method surprisingly exhibit reduced outgassing, as measured by total headspace carbon weight, compared to polyester compositions made without added water. Thus in some embodiments, the polyester composition exhibits a total headspace carbon weight that is at least 10% less than a polyester composition made by the same method, except the water content of the polyester mixture is less than 0.1 weight percent, based on the weight of the polyester, when measured after heat aging at 160° C. for 20 hours. Within this range the total headspace carbon weight can be greater than or equal to 10% and less than or equal to 90% less than a polyester composition made by the same method, except the water content of the polyester mixture is less than 0.1 weight percent.

The polyester composition can be distinguished from other polyester compositions by the absence of certain components. For example, In some embodiments of the method, the polyester composition made by the method, and the article comprising the polyester composition, the polyester mixture further comprises 0 to less than 1 weight percent of impact modifiers; 0 to less than 1 weight percent of copolymers of monomers comprising an unsubstituted or substituted styrene, and an unsaturated nitrile; and 0 to less than 1 weight percent of reinforcing fillers; wherein epoxy compounds are excluded from the composition.

A method of forming the polyester composition comprises melt blending the polyester mixture, for example by extrusion. The melt blending can be performed using commercial equipment such as ribbon blenders, Henschel mixers, Banbury mixers, drum tumblers, single-screw extruders, twin-screw extruders, multi-screw extruders, or co-kneaders. For example, the polyester composition can be prepared by extruding the polyester mixture in a twin-screw extruder at a temperature of 230 to 270° C., specifically 240 to 260° C. All of the components except the water can be pre-mixed and added to the first zone of an extruder, and the water added in a middle zone. The water can also be premixed with the other components and added to the first zone of the extruder. All of the variations in the polyester mixture described herein apply as well to the method of preparing the polyester composition.

The polyester composition can be formed into articles by shaping, extruding, or molding. Articles can be molded from the polyester composition by known methods, such as injection molding, injection compression molding, gas assist injection molding, rotary molding, blow molding, compression molding, and related molding processes. In some embodiments, the article is formed by injection molding. The injection molding conditions can include a barrel temperature of 230 to 280° C., specifically 240 to 270° C., and a mold temperature of 30 to 100° C., specifically 40 to 80° C. Thus in some embodiments, an article comprises a polyester composition made by a method comprising melt blending of a polyester mixture comprising a polyester having repeat units derived from 1,4-butanediol and 0.2 to 2 weight percent water, based on the weight of the polyester. All of the variations in the polyester mixture and polyester composition described herein apply as well to the article comprising the polyester composition.

Articles comprising polyester compositions made by the method surprisingly exhibit reduced outgassing, as measured by total headspace carbon weight, compared to articles comprising polyester compositions made without added water. Thus in some embodiments, the article comprising the polyester composition exhibits a total headspace carbon weight that is at least 10% less than a composition made by the same method, except the water content of the mixture is less than 0.1 weight percent, based on the weight of the polyester, when measured after heat aging at 160° C. for 20 hours.

Advantageously, the articles comprising the polyester compositions are particularly suited for direct metallization without a primer coating. Thus, in some embodiments, the article comprises a thermoplastic substrate comprising the polyester composition; and a metal layer in contact with a surface of the thermoplastic substrate. Examples of such articles include automotive headlight reflectors and bezels. Thus in some embodiments, the article comprising the polyester composition is an automotive headlight reflector or bezel.

The FIGURE shows an exploded view of an automotive headlamp assembly 20. The headlamp has a housing 22 which contains reflector assembly 25, a light source 26 and an electrical connector 21 for attachment to the electrical system of a vehicle. A bezel 27 and a lens 23 are disposed on the exterior of the housing such that light leaving the housing passes through the bezel and the lens. Either or both of the reflector assembly 25 and the bezel 27 can be made by metallizing a thermoplastic substrate comprising the polyester composition described herein.

The invention includes at least the following embodiments.

Embodiment 1

A method for reducing outgassing of a polyester having repeat units derived from 1,4-butanediol, comprising melt blending a polyester mixture comprising the polyester and 0.2 to 2 weight percent water, based on the weight of the polyester.

Embodiment 2

The method of embodiment 1, wherein the polyester mixture further comprises 0.01 to 0.5 weight percent, based on the weight of the polyester, of a quencher.

Embodiment 3

The method of Embodiment 1 or 2, wherein the quencher is a phosphorous compound of structure:

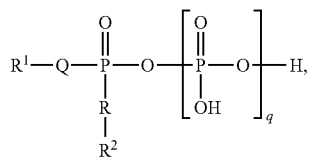

or salt thereof; wherein Q and R are each independently a direct bond or O; wherein $R^1$ and $R^2$ are independently selected from H, —OH, and substituted or unsubstituted $C_{1-20}$ alkyl, $C_{6-20}$ aryl, and poly(oxy $C_{2-4}$ alkylene); wherein a substituent, when present, is independently 1 or 2 in number on any of $R^1$ and $R^2$, and are independently selected from —OH, halogen, —COOH, —COOR$^3$ (wherein $R^3$ is $C_{1-4}$ alkyl) and —NH$_2$; wherein $R^1$ and $R^2$ are optionally linked together by a $C_{2-20}$ hydrocarbylene bridge; and wherein q is 0 or 1.

Embodiment 4

The method of embodiment 1, wherein the polyester mixture excludes quenchers.

Embodiment 5

The method of embodiment 3 wherein the polyester mixture excludes quenchers other than the phosphorous compound.

Embodiment 6

The method of any of embodiments 1-5, wherein the polyester is selected from a poly(butylene terephthalate), a copolyetherester comprising a poly(butylene terephthalate) block and a polyalkylene oxide block, and a combination thereof.

Embodiment 7

The method of any of embodiments 1-6, wherein the polyester comprises a poly(butylene terephthalate) having an intrinsic viscosity of 0.6 to 1.5 deciliter per gram measured at 30° C. in 60:40 weight/weight phenol/tetrachloroethane.

Embodiment 8

The method of any of embodiments 1-7, wherein the polyester mixture further comprises 0.1 to 10 weight percent, based on the weight of the polyester, of an additive selected from the group consisting of flame retardants, fillers, colorants, stabilizers, mold release agents, lubricants, nucleating agents, and a combination thereof.

Embodiment 9

The method of embodiment 1, wherein the polyester mixture comprises poly(butylene terephthalate) having an intrinsic viscosity of 0.6 to 1.5 deciliter per gram measured at 30° C. in 60:40 weight/weight phenol/tetrachloroethane; and 0.25 to 1.5 weight percent water.

Embodiment 10

The method of embodiment 9, wherein the polyester mixture further comprises 0.05 to 0.2 weight percent, based on the weight of the polyester, of a quencher.

Embodiment 11

A polyester composition made by a method comprising melt blending of a polyester mixture comprising a polyester having repeat units derived from 1,4-butanediol and 0.2 to 2 weight percent water, based on the weight of the polyester.

Embodiment 12

The polyester composition of embodiment 11, wherein the polyester mixture further comprises 0.01 to 0.5 weight percent, based on the weight of the polyester, of a quencher.

Embodiment 13

The polyester composition of embodiment 11 or 12, wherein the polyester composition exhibits a total headspace carbon weight that is at least 10% less than the headspace carbon weight exhibited by a polyester composition made by the same method, except the water content of the polyester mixture is less than 0.1 weight percent, based on the weight of the polyester, when measured after heat aging at 160° C. for 20 hours.

Embodiment 14

The polyester composition of any of embodiments 11-13, further comprising: 0 to less than 1 weight percent of impact modifiers; 0 to less than 1 weight percent of copolymers of monomers comprising an unsubstituted or substituted styrene, and an unsaturated nitrile; and 0 to less than 1 weight percent of reinforcing fillers; wherein epoxy compounds are excluded from the composition.

Embodiment 15

The polyester composition of any of embodiments 11-14, wherein the polyester mixture comprises poly(butylene terephthalate) having an intrinsic viscosity of 0.6 to 1.5 deciliter per gram measured at 30° C. in 60:40 weight/weight phenol/tetrachloroethane; and 0.25 to 1.5 weight percent water.

Embodiment 16

The polyester composition of embodiment 15, further comprising 0.01 to 0.5 weight percent of a quencher selected from a compound of structure:

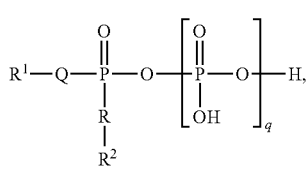

or salt thereof; wherein Q and R are each independently a direct bond or O; wherein $R^1$ and $R^2$ are independently selected from H, —OH, and substituted or unsubstituted $C_{1-20}$ alkyl, $C_{6-20}$ aryl, and poly(oxy $C_{2-4}$ alkylene); wherein a substituent, when present, is independently 1 or 2 in number on any of $R^1$ and $R^2$, and are independently selected from —OH, halogen, —COOH, —COOR$^3$ (wherein $R^3$ is $C_{1-4}$ alkyl) and —NH$_2$; wherein $R^1$ and $R^2$ are optionally linked together by a $C_{2-20}$ hydrocarbylene bridge; and wherein q is 0 or 1.

Embodiment 17

An article comprising a polyester composition made by a method comprising melt blending of a polyester mixture comprising a polyester having repeat units derived from 1,4-butanediol and 0.2 to 2 weight percent water, based on the weight of the polyester.

Embodiment 18

The article of embodiment 17, wherein the polyester mixture further comprises 0.01 to 0.5 weight percent of a quencher selected from a compound of structure:

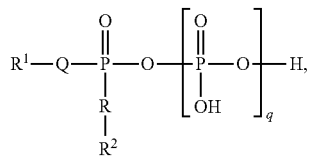

or salt thereof; wherein Q and R are each independently a direct bond or O; wherein $R^1$ and $R^2$ are independently selected from H, —OH, and substituted or unsubstituted $C_{1-20}$ alkyl, $C_{6-20}$ aryl, and poly(oxy $C_{2-4}$ alkylene); wherein a substituent, when present, is independently 1 or 2 in number on any of $R^1$ and $R^2$, and are independently selected from —OH, halogen, —COOH, —COOR$^3$ (wherein $R^3$ is $C_{1-4}$ alkyl) and —NH$_2$; wherein $R^1$ and $R^2$ are optionally linked together by a $C_{2-20}$ hydrocarbylene bridge; and wherein q is 0 or 1.

Embodiment 19

The article of embodiment 17 or 18, comprising: a thermoplastic substrate comprising the polyester composition, and a metal layer in contact with a surface of the thermoplastic substrate.

Embodiment 20

The article of any of embodiments 17-19, wherein the article is an automotive headlight reflector or bezel.

The invention is further illustrated by the following non-limiting examples.

EXAMPLES

Components used to form polyester mixtures and extruded polyester compositions are summarized in Table 1.

TABLE 1

| Component | Description |
|---|---|
| PBT-1 | Poly(butylene terephthalate), CAS Reg. No. 24968-12-5, having an intrinsic viscosity of 1.23-1.30 deciliters/gram at 30° C. in 60:40 weight/weight phenol/tetrachloroethane; obtained as PBT-1100-211X from Chang Chun Plastics Co., Ltd. Pellet form unless indicated otherwise. |
| PBT-2 | Poly(butylene terephthalate), CAS Reg. No. 24968-12-5, having an intrinsic viscosity of 0.718-0.75 deciliter/gram at 30° C. in 60:40 weight/weight phenol/tetrachloroethane; obtained as PBT-1200-211D from Chang Chun Plastics Co., Ltd. Pellet form unless indicated otherwise. |
| AO | Tetrakis[methylene-3-(3',5'-di-t-butyl-4-hydroxyphenyl)-propionate]methane, CAS Reg. No. 6683-19-8; obtained as EVERNOX ™ 10 from Everspring Chemicals Co., Ltd. |
| G70S | Copolymer of hexanedioic acid and 2,2-bis(octadecanoyloxymethyl)-1,3-propanediol, obtained as LOXIOL ™ G70S from Emery Oleochemicals. |
| $H_3PO_3$ | 50 wt. % aqueous solution of phosphorous acid, obtained from Yoneyama Chemical. |
| $H_3PO_4$ | 75 wt. % aqueous solution of phosphoric acid, obtained from Yoneyama Chemical. |
| SAPP | Disodium dihydrogen pyrophosphate, obtained from Yoneyama Chemical. |
| Ca(H$_2$PO$_2$)$_2$ | Calcium hypophosphite, CAS Reg. No. 7789-79-9; obtained from Omichi Seiyaku Co., Ltd. |
| NaH$_2$PO$_2$ | Sodium Hypophosphite, obtained from Sigma-Aldrich. |
| NA-11 | Sodium 2,2'-methylenebis-(4,6-di-tert-butylphenyl) phosphate, obtained from Adeka. |
| AX-71 | Monostearic and distearic acid phosphate, obtained from Adeka. |
| OP-1240 | Aluminium tris-diethylphosphinate, obtained from Clariant. |
| THF | Tetrahydrofuran. |

The polyester compositions were prepared as follows. All components were dry blended in a plastic bag using a SUPER FLOATER™ SFC-50 (Kawata Mfg. Co. Ltd.). The dry blended polyester mixture was added to the feed throat of a twin-screw extruder having a 44-millimeter internal diameter. The polyester mixture was compounded using a barrel temperature of 260° C., a screw rotation rate of 200 rotations/minute, and a throughput of 160 kilograms/hour. The extrudate was cooled and pelletized, and the extruded pellets were dried at 120° C. for 2 hours before use in injection molding.

Square plaques of dimensions 50 millimeters×50 millimeters×3 millimeters were injection molded on a 100-ton molding machine using a barrel temperature of 250° C. and a mold temperature of 80° C.

Number average molecular weight ($M_n$) and weight average molecular weight ($M_w$) were measured by gel permeation chromatography (GPC) against polystyrene standards.

Headspace carbon analyses were conducted based on a "Verband der Automobilindustrie (VDA)" ("The German Association of the Automotive Industry") standard VDA-227. Headspace gas chromatography (GC) was done using a Perkin Elmer Clarus 500 gas chromatograph equipped with a CP wax column 50 meter×0.33 micrometer×2.0 micrometer and a Perkin Elmer Turbomatrix 40 Vtrap headspace sampler. Pellets or molded parts of the polyester compositions were placed in GC vials. The vial and contents were incubated at 160° C. for 20 hours. The released vapors were then sampled for 0.02 minutes and injected by auto sampler into the gas chromatograph. Emission values were reported as total carbon and as total carbon from THF, and expressed as micrograms of carbon per gram of sample.

The effects of water alone and in combination with various quenchers are summarized in Tables 2-5 below. As can be seen from Comparative Example 1 and Examples 1a, 1b, and 1c, water reduces headspace emissions, and the effect is proportional to water amount, with Example 1c with 1.0 wt. % water having the lowest headspace carbon. Comparison of Examples 2, 3, 4, and 5, each having 1.0 wt. % water and 0.10 wt. % of quencher, with Comparative Examples 2, 3, and 4, each having 0.10 wt. % quencher, but no water, and with Example 1c, having 1.00 wt. % water, but no quencher, illustrate that the combination of water and quencher is synergistic. Examples 2, 3, and 4 have lower headspace carbon than all the corresponding comparative Examples.

TABLE 2

|  | CE 1 | E 1a | E 1b | E 1c | CE 2 | E 2 | CE 3 | E 3 |
|---|---|---|---|---|---|---|---|---|
| COMPOSITIONS (PARTS BY WEIGHT) | | | | | | | | |
| PBT-1 | 89.94 | 89.69 | 89.44 | 89.44 | 89.84 | 89.34 | 89.84 | 89.34 |
| PBT-1[a] | 10.00 | 10.00 | 10.00 | 10.00 | 10.00 | 10.00 | 10.00 | 10.00 |
| AO | 0.06 | 0.06 | 0.06 | 0.06 | 0.06 | 0.06 | 0.06 | 0.06 |
| G70S | — | — | — | — | — | — | — | — |
| Water | — | 0.25 | 0.50 | 1.00 | — | 1.00 | — | 1.00 |
| $H_3PO_3$ | — | — | — | — | 0.10 | 0.10 | — | — |
| $H_3PO_4$ | — | — | — | — | — | — | 0.10 | 0.10 |
| HEADSPACE CARBON (μg C/g) - PELLETS, 160° C. for 20 hr. | | | | | | | | |
| Total | 50 | 41 | 32 | 19 | 20 | 12 | 33 | 17 |
| THF | 47 | 39 | 30 | 14 | 17 | 7 | 24 | 12 |
| HEADSPACE CARBON (μg C/g) - MOLDED PARTS, 160° C. for 20 hr. | | | | | | | | |
| Total | — | — | — | 22 | 23 | 12 | 35 | 26 |
| THF | — | — | — | 20 | 20 | 9 | 23 | 17 |

[a]Powder

TABLE 3

|  | E 1c | CE 4 | E 4 | CE 5 | E 5 |
|---|---|---|---|---|---|
| COMPOSITIONS (PARTS BY WEIGHT) | | | | | |
| PBT-1 | 89.44 | 89.84 | 89.34 | 89.84 | 89.34 |
| PBT-1[a] | 10 | 10 | 10 | 10 | 10 |
| AO | 0.06 | 0.06 | 0.06 | 0.06 | 0.06 |
| G70S | — | — | — | — | — |
| Water | 1.0 | — | 1.0 | — | 1.0 |
| SAPP | — | 0.1 | 0.1 | — | — |
| $Ca(H_2PO_2)_2$ | — | — | — | 0.1 | 0.1 |
| HEADSPACE CARBON (μg C/g) - PELLETS, 160° C. for 20 hr. | | | | | |
| Total | 19 | 27 | 16 | 23 | 29 |
| THF | 14 | 22 | 12 | 18 | 19 |
| HEADSPACE CARBON (μg C/g) - MOLDED PARTS, 160° C. for 20 hr. | | | | | |
| Total | 22 | 32 | 22 | 19 | 16 |
| THF | 20 | 29 | 19 | 16 | 3 |

[a]Powder

In Examples 6, 7, and 8, the effect of water in combination with quencher on headspace carbon in the presence of G70S, a mold release agent, was evaluated. The results are summarized in Table 4. As can be seen from Comparative Examples 6b, 7, and 8, 0.10 wt. % of quencher (50 wt. % aqueous $H_3PO_3$, $Ca(H_2PO_2)_2$, and $NaH_2PO_2$, respectively) either has no effect, or actually increases, headspace carbon. However the combinations of 1.00 wt. % water and 0.10 wt. % of the quenchers results in reduced carbon head space. Comparative Example 8 can be compared to Example 1, fifth entry, of Table 1 of U.S. Pat. No. 8,148,489 to Peacock and Wrigley (column 9, line 20), which has 0.1 wt. % sodium hypophosphite.

TABLE 4

|  | CE 6a | CE 6b | E 6 | CE 7 | E 7 | CE 8 | E 8 |
|---|---|---|---|---|---|---|---|
| COMPOSITIONS (PARTS BY WEIGHT) | | | | | | | |
| PBT-1 | 89.64 | 89.54 | 89.54 | 89.44 | 89.84 | 89.34 | 89.84 |
| PBT-1[a] | 10.00 | 10.00 | 10.00 | 10.00 | 10.00 | 10.00 | 10.00 |
| AO | 0.06 | 0.06 | 0.06 | 0.06 | 0.06 | 0.06 | 0.06 |
| G70S | 0.30 | 0.30 | 0.30 | 0.30 | 0.30 | 0.30 | 0.30 |
| Water | — | — | 1.00 | — | 1.00 | — | 1.00 |
| $H_3PO_3$ | — | 0.10 | 0.10 | — | — | — | — |
| $Ca(H_2PO_2)_2$ | — | — | — | 0.10 | 0.10 | — | — |
| $NaH_2PO_2$ | — | — | — | — | — | 0.10 | 0.10 |
| HEADSPACE CARBON (μg C/g) - PELLETS, 120° C. for 5 hr. | | | | | | | |
| Total | 12 | 12 | 5 | 12 | 5 | 13 | 4 |
| THF | 10 | 10 | 3 | 10 | 3 | 11 | 3 |
| HEADSPACE CARBON (μg C/g) - MOLDED PARTS, 120° C. for 5 hr. | | | | | | | |
| Total | 20 | 21 | 12 | 27 | 12 | 21 | 10 |
| THF | 15 | 17 | 8 | 23 | 9 | 17 | 8 |

[a]Powder

In Examples 9-12, the effect of water in combination with quencher on headspace carbon in blends of high intrinsic viscosity (PBT-1) and low instrinsic viscosity (PBT-2) poly (butylene terephthalate) in the presence of 0.30 wt. % mold release agent was evaluated. The results are summarized in Table 5. As can be seen in Table 5, although headspace carbon was reduced with 0.10 wt. % of the quenchers SAPP, NA-11, and AX-71 (Comparative Examples 9c, 10, 11, and 12, respectively), the combination of 1.00 wt. % water and 0.10 wt. % quencher gave higher reductions in carbon headspace. Comparative Example 10 can be compared to Example 1, twelfth entry, of Table 1 of U.S. Pat. No. 8,148,489 to Peacock and Wrigley (column 9, line 41), which has 0.1 wt. % sodium 2,2'-methylenebis-(4,6-di-tert-butylphenyl) phosphate. Comparative Example 12 can be compared to Example 1, fourteenth entry, of Table 1 of U.S. Pat. No. 8,148,489 (column 9, line 46), which has 0.1 wt. % aluminum tris-diethylphosphinate.

TABLE 5

|  | CE 9a | CE 9b | CE 9c | E 9 | CE 10 | E 10 | CE 11 | E11 | CE 12 | E12 |
|---|---|---|---|---|---|---|---|---|---|---|
| COMPOSITIONS (PARTS BY WEIGHT) | | | | | | | | | | |
| PBT-2 | 67.00 | 67.00 | 67.00 | 67.00 | 67.00 | 67.00 | 67.00 | 67.00 | 67.00 | 67.00 |
| PBT-1 | 29.38 | 29.38 | 29.29 | 28.39 | 29.29 | 28.39 | 29.29 | 28.39 | 29.29 | 28.39 |
| PBT-1[a] | 3.26 | 3.26 | 3.25 | 3.15 | 3.25 | 3.15 | 3.25 | 3.15 | 3.25 | 3.15 |
| AO | 0.06 | 0.06 | 0.06 | 0.06 | 0.06 | 0.06 | 0.06 | 0.06 | 0.06 | 0.06 |
| G70S | — | 0.30 | 0.30 | 0.30 | 0.30 | 0.30 | 0.30 | 0.30 | 0.30 | 0.30 |
| Water | — | — | — | 1.00 | — | 1.00 | — | 1.00 | — | 1.00 |
| SAPP | — | — | 0.10 | 0.10 | — | — | — | — | — | — |
| NA-11 | — | — | — | — | 0.10 | 0.10 | — | — | — | — |

TABLE 5-continued

|  | CE 9a | CE 9b | CE 9c | E 9 | CE 10 | E 10 | CE 11 | E11 | CE 12 | E12 |
|---|---|---|---|---|---|---|---|---|---|---|
| AX-71 | — | — | — | — | — | — | 0.10 | 0.10 | — | — |
| OP-1240 | — | — | — | — | — | — | — | — | 0.10 | 0.10 |
| HEADSPACE CARBON (μg C/g) - PELLETS, 120° C. for 5 hr. | | | | | | | | | | |
| Total | 33 | 34 | 25 | 21 | 31 | 19 | 28 | 16 | 25 | 16 |
| THF | 31 | 32 | 23 | 19 | 28 | 17 | 27 | 14 | 23 | 13 |
| HEADSPACE CARBON (μg C/g) - MOLDED PARTS, 120° C. for 5 hr. | | | | | | | | | | |
| Total | 97 | 107 | 75 | 41 | 63 | 47 | 69 | 44 | 43 | 34 |
| THF | 94 | 104 | 73 | 39 | 59 | 44 | 63 | 41 | 39 | 30 |

[a]Powder

The effect of water on the molecular weight of the poly(butylene terephthalate) and the physical properties of the molding compositions were evaluated. The results are summarized in Table 6. As can be seen from Table 6, there is negligible change in $M_n$, $M_w$, and MFI in the presence of 0.25 and 0.5 weight percent water. (There is a slight increase in $M_n$, $M_w$, and MFI in E 13a and E 13b relative to CE 13, in the absence of G70S.) These data show that, surprisingly, 0.25 and 0.5 weight percent water does not result in significant hydrolytic degradation of the poly(butylene terephthalate). Moreover, aside from slight decreases for E 13a and E 13b relative to CE 13, in the absence of G70S, 0.25 and 0.5 weight percent water has no adverse affect on Izod impact strength, tensile strength, tensile elongation, flexural strength, and flexural modulus.

TABLE 6

|  | CE 13 | E 13a | E 13b | CE 14 | E 14a | E 14b |
|---|---|---|---|---|---|---|
| COMPOSITIONS (PARTS BY WEIGHT) | | | | | | |
| PBT-1 | 89.94 | 89.69 | 89.44 | 89.59 | 89.34 | 89.09 |
| PBT-1[a] | 10 | 10 | 10 | 10 | 10 | 10 |
| G70S | — | — | — | 0.35 | 0.35 | 0.35 |
| AO | 0.06 | 0.06 | 0.06 | 0.06 | 0.06 | 0.06 |
| Water | — | 0.25 | 0.5 | — | 0.25 | 0.5 |
| PHYSICAL PROPERTIES | | | | | | |
| $M_n$ (Da) | 21,800 | 22,600 | 22,700 | 22,900 | 23,000 | 22,800 |
| $M_w$ (Da) | 70,800 | 72,300 | 72,200 | 73,000 | 73,900 | 72,100 |
| Izod IS (kg · cm/cm) | 6.1 | 4.9 | 5.1 | 6.4 | 6.3 | 6.4 |
| TS (kg/cm$^2$) | 509 | 493 | 492 | 490 | 519 | 493 |
| TE (%) | 895 | 732 | 778 | 727 | 738 | 942 |
| FS (kg/cm$^2$) | 833 | 816 | 801 | 799 | 790 | 792 |
| FM (kg/cm$^2$) | 24,582 | 24,134 | 24,003 | 24,259 | 23,748 | 23,931 |
| MFI[b] (g/10 min) | 13.0 | 13.6 | 13.4 | 13.0 | 13.0 | 13.1 |

[a]Powder
[b]Melt mass-flow index, expressed in grams per 10 minutes (g/10 min) was measured at 250° C. under a load of 2.16 kilograms (kg).

As used herein, "CE" refers to Comparative Example; "E" refers to Example; "IS" refers to impact strength; "TS" refers to tensile strength; "TE" refers to tensile elongation; "FS" refers to flexural strength; "FM" refers to flexural modulus; and "MFI" refers to melt flow index. The terms "a" and "an" do not denote a limitation of quantity, but rather the presence of at least one of the referenced items. The term "substituted" as used herein means that at least one hydrogen on the designated group is replaced with another atom or group. As used herein, the terms "hydrocarbyl" and "hydrocarbylene", whether used by itself, or as a prefix, suffix, or fragment of another term, refers to a monovalent or divalent group, respectively, that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon groups. However, when the hydrocarbyl group is specifically described as substituted, it can contain heteroatoms other than the carbon and hydrogen members of the substituent residue. Thus, when described as substituted, the hydrocarbyl residue contains one or more heteroatoms such as a halogen, oxygen, nitrogen, sulfur, phosphorus, or silicon. When specifically described as substituted, the hydrocarbyl residue can also contain one or more carbonyl groups, amino groups, hydroxyl groups, or the like, or it can contain heteroatoms within the backbone of the hydrocarbyl residue.

Recitation of ranges of values are merely intended to serve as a shorthand method of referring individually to each separate value falling within the range, unless otherwise indicated herein, and each separate value is incorporated into this specification as if it were individually recited. Thus each range disclosed herein constitutes a disclosure of any subrange falling within the disclosed range. Disclosure of a narrower range or more specific group in addition to a broader range or larger group is not a disclaimer of the broader range or larger group. All ranges disclosed herein are inclusive of the endpoints, and the endpoints are independently combinable with each other.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. A method for reducing outgassing of a polyester having repeat units derived from 1,4-butanediol, comprising melt blending a polyester mixture comprising the polyester and 0.2 to 2 weight percent water, based on the weight of the polyester.

2. The method of claim 1, wherein the polyester mixture further comprises 0.01 to 0.5 weight percent, based on the weight of the polyester, of a quencher.

3. The method of claim 2, wherein the quencher is a phosphorous compound of structure:

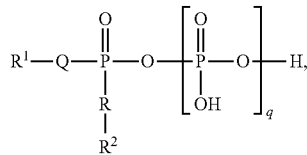

or salt thereof;
wherein Q and R are each independently a direct bond or O;
wherein $R^1$ and $R^2$ are independently selected from H, —OH, and substituted or unsubstituted $C_{1-20}$ alkyl, $C_{6-20}$ aryl, and poly(oxy $C_{2-4}$ alkylene);
wherein a substituent, when present, is independently 1 or 2 in number on any of $R^1$ and $R^2$, and are independently selected from —OH, halogen, —COOH, —COOR³ (wherein $R^3$ is $C_{1-4}$ alkyl) and —NH$_2$;
wherein $R^1$ and $R^2$ are optionally linked together by a $C_{2-20}$ hydrocarbylene bridge; and
wherein q is 0 or 1.

4. The method of claim 1, wherein the polyester mixture excludes quenchers, wherein the quenchers are selected from the group consisting of phosphorous compounds, boric acid, aliphatic or aromatic carboxylic acids, carboxylic acid anhydrides, polyols, epoxies, or a combination thereof.

5. The method of claim 3, wherein the polyester mixture excludes quenchers selected from the group consisting of boric acid, aliphatic or aromatic carboxylic acids, carboxylic acid anhydrides, polyols, epoxies, or a combination thereof.

6. The method of claim 1, wherein the polyester is selected from a poly(butylene terephthalate), a copolyetherester comprising a poly(butylene terephthalate) block and a polyalkylene oxide block, and a combination thereof.

7. The method of claim 1, wherein the polyester comprises a poly(butylene terephthalate) having an intrinsic viscosity of 0.6 to 1.5 deciliter per gram measured at 30° C. in 60:40 weight/weight phenol/tetrachloroethane as determined in accordance with ASTM D2857-95 (2007).

8. The method of claim 1, wherein the polyester mixture further comprises 0.1 to 10 weight percent, based on the weight of the polyester, of an additive selected from the group consisting of flame retardants, fillers, colorants, stabilizers, mold release agents, lubricants, nucleating agents, and a combination thereof.

9. The method of claim 1, wherein the polyester mixture comprises poly(butylene terephthalate) having an intrinsic viscosity of 0.6 to 1.5 deciliter per gram measured at 30° C. in 60:40 weight/weight phenol/tetrachloroethane; and 0.25 to 1.5 weight percent water as determined in accordance with ASTM D2857-95 (2007).

10. The method of claim 9, wherein the polyester mixture further comprises 0.05 to 0.2 weight percent, based on the weight of the polyester, of a quencher.

11. A polyester composition made by a method comprising melt blending of a polyester mixture comprising a polyester having repeat units derived from 1,4-butanediol and 0.2 to 2 weight percent water, based on the weight of the polyester.

12. The polyester composition of claim 11, wherein the polyester mixture further comprises 0.01 to 0.5 weight percent, based on the weight of the polyester, of a quencher.

13. The polyester composition of claim 11, wherein the polyester mixture comprises poly(butylene terephthalate) having an intrinsic viscosity of 0.6 to 1.5 deciliter per gram measured at 30° C. in 60:40 weight/weight phenol/tetrachloroethane; and 0.25 to 1.5 weight percent water as determined in accordance with ASTM D2857-95 (2007).

14. The polyester composition of claim 13, further comprising 0.01 to 0.5 weight percent of a quencher selected from a compound of structure:

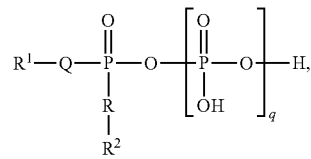

or salt thereof;
wherein Q and R are each independently a direct bond or O;
wherein $R^1$ and $R^2$ are independently selected from H, —OH, and substituted or unsubstituted $C_{1-20}$ alkyl, $C_{6-20}$ aryl, and poly(oxy $C_{2-4}$ alkylene);
wherein a substituent, when present, is independently 1 or 2 in number on any of $R^1$ and $R^2$, and are independently selected from —OH, halogen, —COOH, —COOR³ (wherein $R^3$ is $C_{1-4}$ alkyl) and —NH$_2$;
wherein $R^1$ and $R^2$ are optionally linked together by a $C_{2-20}$ hydrocarbylene bridge; and
wherein q is 0 or 1.

15. Article comprising the polyester composition of claim 11, wherein the article is an automotive headlight reflector or bezel.

16. The method of claim 1, wherein the polyester exhibits a total headspace carbon weight that is at least 10% less than the headspace carbon weight exhibited by a polyester composition made by the same method, except the water content of the polyester mixture is less than 0.1 weight percent, based on the weight of the polyester, when measured after heat aging at 160° C. for 20 hours.

17. The polyester composition of claim 11, wherein the polyester composition exhibits a total headspace carbon weight that is at least 10% less than the headspace carbon weight exhibited by a polyester composition made by the same method, except the water content of the polyester mixture is less than 0.1 weight percent, based on the weight of the polyester, when measured after heat aging at 160° C. for 20 hours.

* * * * *